Dec. 2, 1930.     W. H. SOMMER     1,783,947
STOP MECHANISM FOR DETECTING IRREGULARITIES IN WIRE FEEDING
Filed June 29, 1929     3 Sheets-Sheet 1

INVENTOR.
William H. Sommer
ATTY

Dec. 2, 1930.  W. H. SOMMER  1,783,947
STOP MECHANISM FOR DETECTING IRREGULARITIES IN WIRE FEEDING
Filed June 29, 1929  3 Sheets-Sheet 2

INVENTOR.
William H. Sommer
Chas. H. LaPorte
ATTY

Dec. 2, 1930.    W. H. SOMMER    1,783,947
STOP MECHANISM FOR DETECTING IRREGULARITIES IN WIRE FEEDING
Filed June 29, 1929    3 Sheets-Sheet 3

INVENTOR.

Atty

Patented Dec. 2, 1930

1,783,947

UNITED STATES PATENT OFFICE

WILLIAM H. SOMMER, OF PEORIA, ILLINOIS

STOP MECHANISM FOR DETECTING IRREGULARITIES IN WIRE FEEDING

Application filed June 29, 1929. Serial No. 374,702.

This invention has reference to improvements in the machines for making wire fence fabrics and particularly to machines which are designed to manufacture, what is known in the trade as "poultry fencing" or "poultry netting" and to "straight-line poultry fence" of the poultry types of fencing.

The invention shown and described herein is an improvement upon the machine shown and described in an application for Letters Patent filed by me January 14, 1929, bearing Serial No. 332,343.

The present invention has for its principal object to provide a more efficient and a more sensitive mechanism for automatically stopping the machine on the stoppage, breaking or running out of any of the wires used in the manufacture of such a "fencing" or "netting", whereby to prevent the manufacture of faulty fencing, it being necessary to correct any such irregularity in the feeding of the wires before the machine can continue its operations.

Other and further objects will more fully appear from the following description.

That the invention may be more fully understood, reference is had to the accompanying drawings forming part of this description, illustrating a preferred embodiment of the invention, in which:—

Fig. 9 is a sectional detail, in plan, of the timer means, and

Like characters of reference denote corresponding parts thruout the figures.

In illustrating the invention, I have not deemed it necessary or desirable to show the application of the same to any particular fence fabric machine, nor to detail any such machine, except in the reference to such a machine shown in my pending application, bearing Serial No. 332,343, wherein is shown and described all the operating parts essential to a machine of that character, including the wire connecting or twisting means, operating means therefor and a clutch means to control the movement of parts and clutch shifting means for said clutch.

In the present disclosure, I show the same clutch shifting means, solenoid and substantially the same timer means of my pending application and believe this sufficient to show the use of the present invention, without further or additional drawings to that end, especially since the invention per se is not directed to such parts, except in combination with what is disclosed herein as new.

Figure 1:
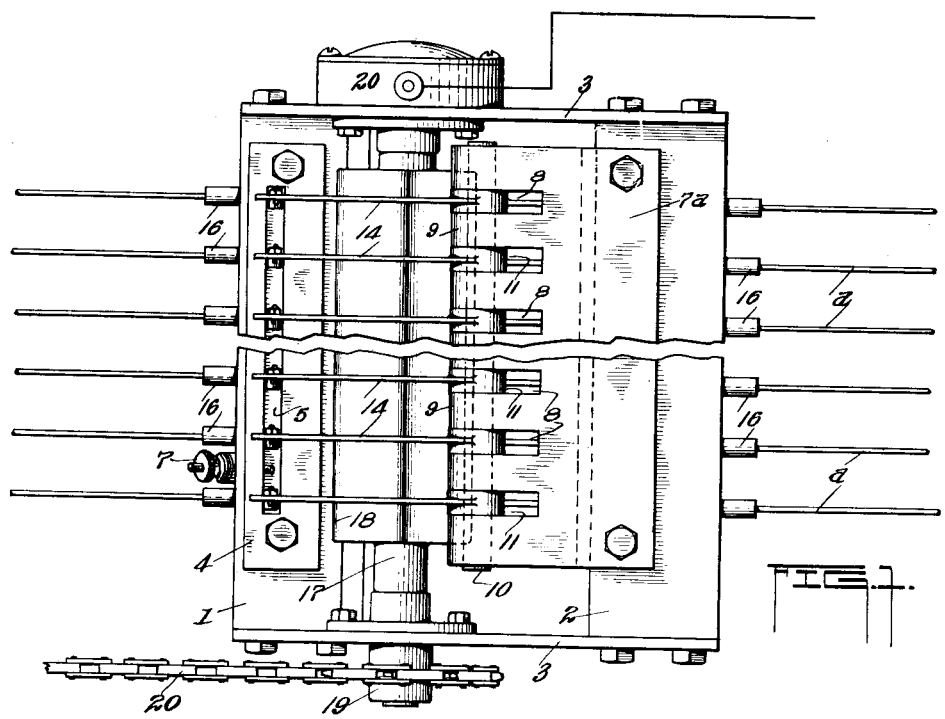
Fig. 1 is a plan view, broken away, of enough of a machine to illustrate the application of my invention thereto.
Figure 2:
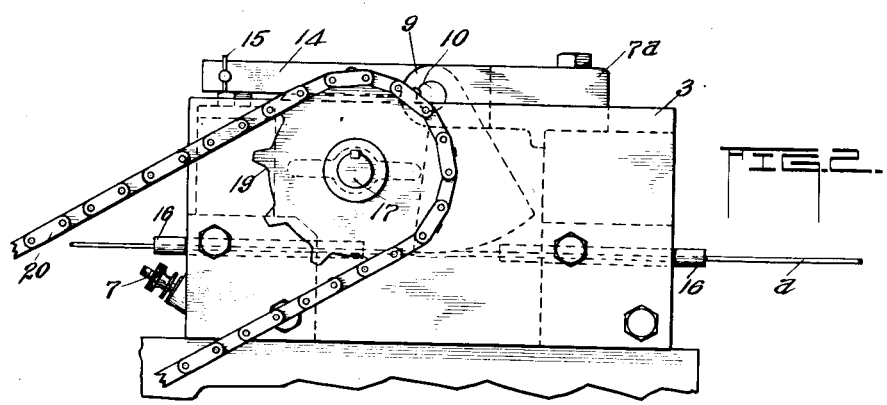
Fig. 2 is a side elevation of Fig. 1.

The mechanism which I am about to describe and which is shown in assembly views, in Figs. 1 and 2, is preferably located on the machine between the wire supply means, such as the blocks, reels or spools and the wire connecting or weaving mechanisms, and may be incorporated when initially designing a machine or be constructed as an attachment for machines where it is desired to supply an efficient means for detecting when a wire may stop, break or run out and thereby stop the machine until such an irregularity can be repaired and thus avoid the making of faulty fences. It is here pointed out that the means I employ to effect the stoppage of the machine is operative, not only, on the breaking of a wire, but on a wire running out, or when the tension in the wires drop sufficiently to remove an effective frictional contact between the wires and certain of the operative parts of the mechanism.

The structure comprehends a frame which includes spaced parallel bars or beams 1 and 2 which are connected at their opposite ends by heads 3. Supported by the bar or beam 1 and of sufficient length to accommodate as many wires as it may be desirable to feed into the machine, is a liquid switch carrying member 4 made of suitable insulating material and said member is provided with a liquid receiving well or pocket 5 in which mercury 6 or its equivalent may be carried and in association with said well or pocket 5 the member 4 is provided with a binding post 7, the inner end of which is in contact with the mercury, see Figs. 3, 4 and 5. The well or pocket 5 is inclined to the straight side walls of the member 4 so as to correspond somewhat to the arc of movement of contact arms to be described, which are adapted for insertion into and removal from said well or pocket.

Supported by the bar or beam 2, is a bearing member 7a which is formed or provided with a multiplicity of slots 8 providing ears 9 on either side of such slots and thru said ears and crossing such slots is carried or extended a spindle member 10, on which and in each slot is carried a wire contacting member 11 with which wires a are adapted to have frictional engagement. These members are all duplicates of each other, function in substantially the same way and one each is provided for each wire a fed into the machine. The member 11 includes the segment portion 12 having a wire surface contacting periphery 13 which is preferably struck on an arc of a circle, the center of which is the axis of the spindle 10. Said member further includes the arm 14 which extends at substantially right angles from the segment 12, see Figs. 3, 4 and 5. The member 11 with its segment 12 and arm 14 is capable of free oscillatory movement on the spindle 10 and its segment and arm are in substantial balanced relation. The segment portion 12 of the arm is oscillatable in the space formed by the spacing of the bars or beams 1 and 2 and the arm 14 overlies the switch carrying member 4 to be moved away from and toward said member 4 with the oscillation of its segment 12. To the outer end of the arm 14 is connected the upper end of a contact member 15 which is preferably arcuate in outline and effects an arc struck substantially from the axis of the spindle 10 so as to adapt said member 15 to enter and be removed from the well or pocket 5 and when in such well or pocket to contact with the mercury 6, as it is believed will be understood, the binding post 7 and said mercury 6 providing a liquid switch.

The wires a, one for each wire contacting member 11 are adapted to be fed or drawn thru guides 16, one each in a bar or beam 1 and 2 and the wires leaving one guide and entering the other crosses the space between the bars or beams 1 and 2 and each wire is adapted to have a frictional contact with the wire contacting periphery 13 of a segment 12. This frictional contact may be more or less, as may be desired or necessary in the efficient operation of the machine, and initially these elements are designed with this in mind.

Disposed cross-wise and in front of the series of members 11 and particularly the segment portions 12 thereof, is a cam shaft 17. The cam portions 18 of said shaft are disposed diametrically to each other and are adapted to successively and alternately engage with the members 11. When the said members 11 are in the position shown in Fig. 4 there is a full oscillatory movement imparted to them by the cam shaft and under frictional contact of the wires they are immediately returned to again be oscillated by the cam shaft. The cam shaft is adapted to have imparted to it a rather rapid and continuous rotation, so that the members 11 are likewise flipped back and forth rather rapidly, causing the members 15 to alternately move into and out of contact with the said liquid switch. To rotate the shaft 17, one end has connected thereto a sprocket wheel 19 engaged by a sprocket chain 20 adapted to receive its power from some suitable source.

To the other end of the shaft 17 is connected a timer 20. Said timer includes the diametrically located immovable contacts 21, and the associated contact 22 rotatable with the shaft 17.

Figure 10:
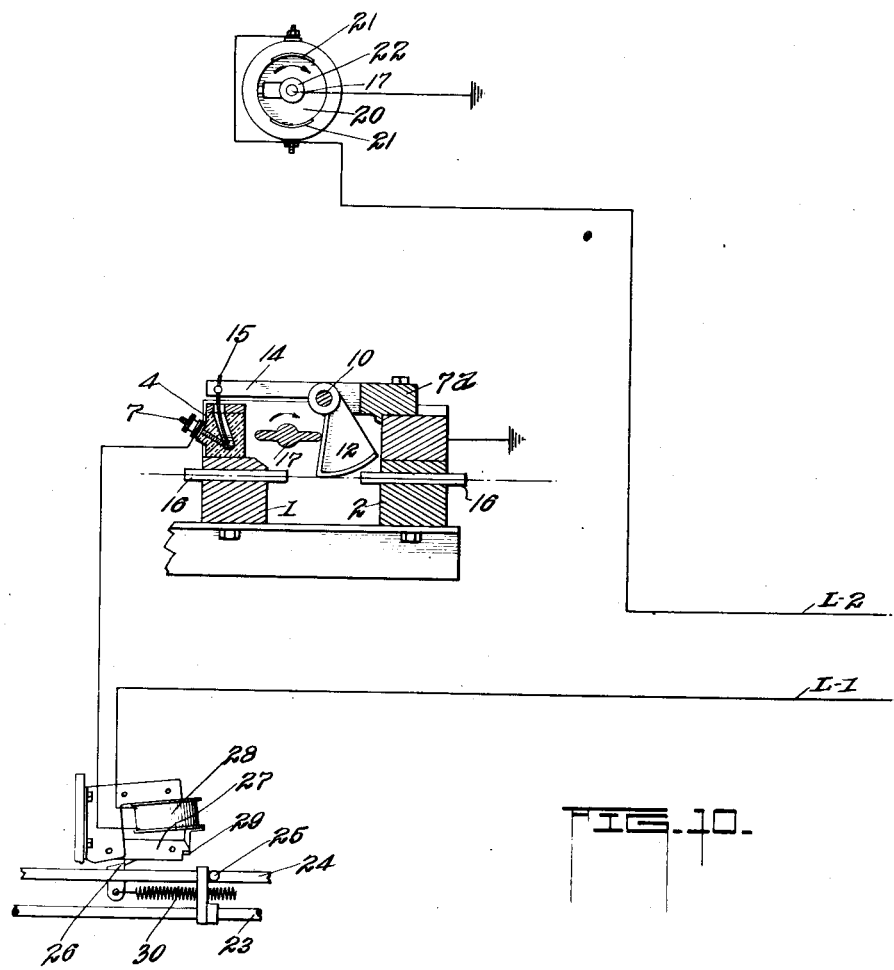
Fig. 10 shows a wiring diagram, which includes the stop mechanism, timer means and a solenoid.

Before describing the electrical circuit thru which a source of current flows to the contacts 21 and the liquid switches, I desire to refer in a rather general way to the clutch shifting mechanism and solenoid which are adapted to be actuated on the stoppage, breakage or running out of a wire a, reference being had to Fig. 10. The clutch, it being understood, is not shown and it is not thought necessary to show it. Adapted for operative connection with a clutch means, is an operator's rod 23. Associated closely with said rod 23 is a bar 24. Said bar has a hand-hold 25 and also a pawl 26 which is adapted to have a locking engagement with a laminated lever 27 in pivotal relation with a solenoid 28 and a stop member 29. Connected with the pawl 26 and, therefore, the bar 24 is a tension spring 30 which would also have connection with a frame part of the machine. Attention is directed to the fact, that this clutch actuating means, as well as the solenoid structure in association therewith, are both fully and in detail described and shown in my pending application, bearing Serial No. 332,343.

Referring to Fig. 10, the source of electric current is traced thru the line L1 to the solenoid 28 and from the latter to the liquid switch and contact members 15, assuming the latter are in contact with the said liquid switch; thence thru the members 11 to the frame, which is the ground and thence thru the cam shaft 17 journaled in the frame, and to the movable contact 22 and either of the contacts 21, assuming that contact is made between 22 and 21 and from thence to the source of supply thru the line L2. The flow of the current is controlled at the timer thru contacts 22 and 21 when and in the event these members are in contact simultaneously with a contact member or members 15 being in contact with the liquid switch.

Figure 3:
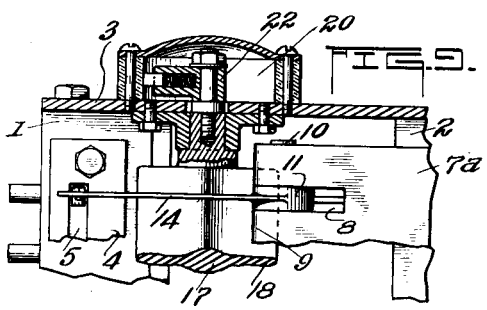
Figs. 3, 4 and 5 are detail sectional views showing different positions of the means, which, when in certain position will operate to stop the machine on the stoppage, breaking or running out of a wire or wires.
Figure 3:
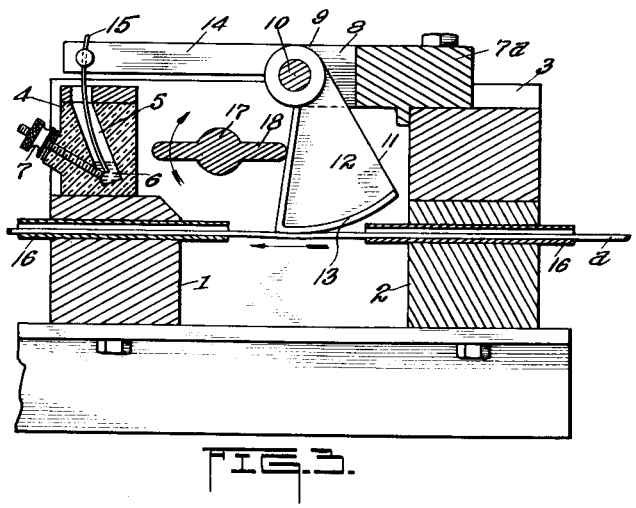
Figure 6:
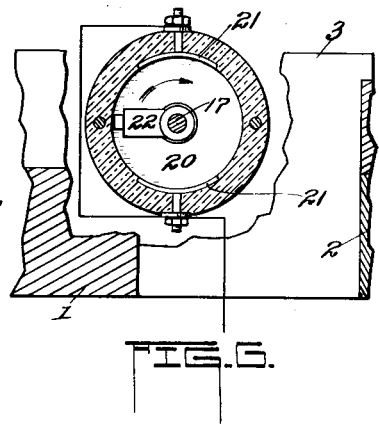
Figs. 6, 7 and 8 are detail sectional views showing different positions of a timer means, operative in association with the stop mechanism, whereby to control the flow of an electrical current when the stop mechanism and said timer simultaneously assume certain predetermined positions.
Figure 4:
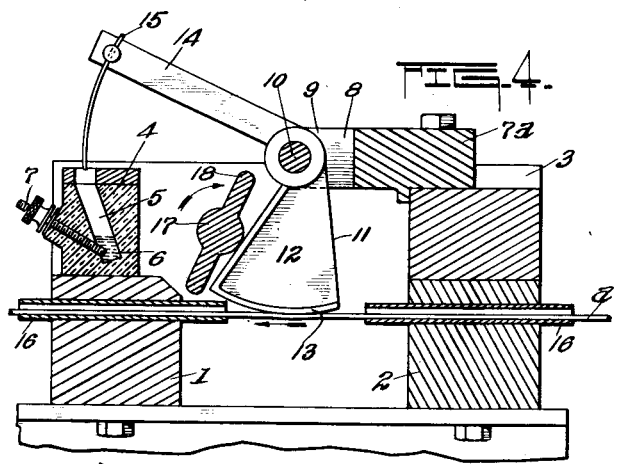
Figure 7:
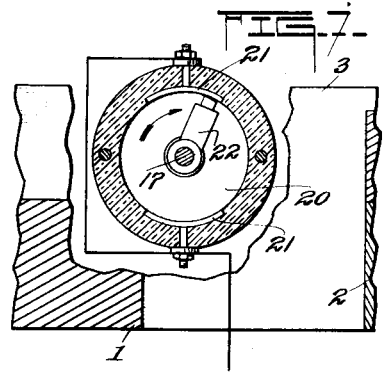

Figs. 3 and 6 illustrate normal wire feeding conditions, at which time, altho the member 15 is in contact with the liquid switch, the member 22 is out of contact with the contacts 21, when the line thru which electricity would be conducted, is open, and the machine will continue in operation. In the position of the parts, as shown, the cam shaft 17 has moved the members 11 back where the wires a, acting on the surfaces of the said members will again move them forward, as for instance, in Fig. 4, the cams or the cam shaft moving to position to allow the wires, by frictional contact with the members 11, to move the same forward and raise their contact members 15 from out of contact with the liquid switch and this is essential, for at this time the rotating contact member 22 of the timer is in contact with one of the contacts 21, as will be seen in Fig. 7. Similar positions of these parts are assumed twice during each revolution of the cam shaft 17, as will be understood.

Figure 5:
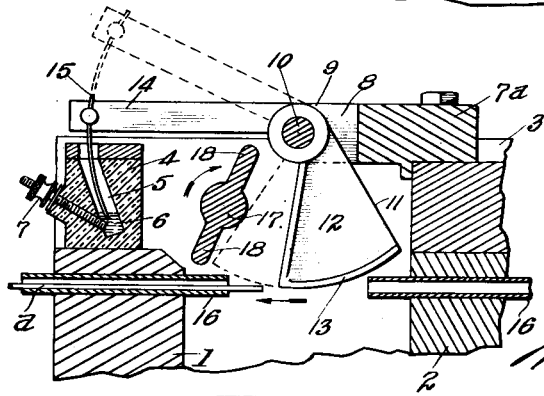
Figure 8:
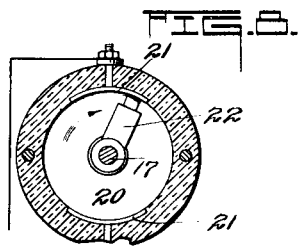

Now assuming that a wire a should stop, or break, or run out, as in Fig. 5, when by the removal of the frictional movement of the wire on its member 11, said member will drop back, or under the action of the cam shaft will be moved from the dotted line position to the full line position shown in Fig. 5, moving the contact member 15 into contact with the liquid switch, and said cam shaft 17 being rapidly and continuously rotated, it would be but a moment when the contact 22 on the timer shaft would be in contact with a contact member 21, as shown in Fig. 8, resulting in closing the electrical circuits and energizing the solenoid 28 to lift the lever 27 which will release the pawl 26, allowing the spring 30 to act to move the bar 24 and the operator's rod 23 and by means not shown, disengage clutch parts, not shown, resulting in the immediate stopping of the machine. The parts described, may be reset when the solenoid is deenergized, permitting the lever 27 to drop into engagement with the stop 29 and the bar 24 and operator's rod 23 moved from non-operative position to operative position, as, no doubt, will be understood.

The type of clutch shifter actuating means, comprising the segments carrying contacts adapted for coaction with a liquid switch, and with the segments provided with surface with which moving wires may have frictional contact and the association of these segments with a cam shaft and a timer thereon having predetermined positions of movement relative to assumed positions of the segments and their contacts, whereby to open and close an electric circuit including a means when energized to actuate the clutch shifter mechanism, provides a sensitive and active stop means operable on the stoppage, or the breaking, or run-out of wires to stop the machine and prevent manufacture of faulty nettings. Such a mechanism is most useful in machines referred to, where the wire fabric is a closely woven fabric requiring a multiplicity of wires and where it is almost beyond human possibility for an attendant to observe each and every wire being fed thru the machine.

What I claim is:—

1. A stop mechanism for detecting irregularities in the feeding of fence wire, comprising a movably supported member with which a wire, when moving, is adapted to have an engaging relation and move the member with the wire, a rotatable member adapted to positively engage said wire engaging member when advanced by the wire and return it to wire actuating position, an electrical circuit including a timer and separable contacts one of which is carried by said wire engaging member and the said contacts engageable to close the circuit when said wire engaging member is in non-operating position by said rotatable member, clutch shifting means operative on the closing of said circuit and said circuit adapted to be closed when the moving contact between the wire and said wire engaging member has ceased and simultaneously with a predetermined position of said timer and the engagement of said contacts.

2. A stop mechanism for detecting irregularities in the feeding of fence wire, comprising a pivotally supported member with which a wire, when moving, is adapted to have a frictional engaging relation and move the member with the wire, a continuously rotatable member adapted to positively engage said pivoted member when advanced by the wire and return it to wire actuating position, an electrical circuit including a timer and separable contacts one of which is carried by said pivoted member and the said contacts engageable to close the circuit when said pivoted member is in non-operating position by said rotatable member, clutch shifting means operative on the closing of said circuit and said circuit adapted to be closed when the moving contact between the wire and said pivoted member has ceased and simultaneously with a predetermined position of said timer and the engagement of said contacts.

3. A stop mechanism for detecting irregularities in the feeding of fence wire, comprising an oscillatable member having a segment portion provided with a friction surface with which a wire, when moving, is adapted to have an engageable relation whereby to move the member with the wire, a continuously rotatable shaft having cam portions adapted to positively and alternately engage said oscillatable member when advanced by the wire to return it to wire actuating position, an electrical circuit including a timer and separable contacts one of which is connected with said oscillatable member and the said contacts engageable to close the circuit when said oscillatable member is in non-operating position by said shaft, clutch shifting means operative on the closing of said circuit and said circuit adapted to be closed when the moving contact between the wire and said oscillatable member has ceased and simultaneously with a predetermined position of said timer and the engagement of said contacts.

4. A stop mechanism for detecting irregularities in the feeding of fence wire, comprising a support, a member freely oscillatable on said support with which a wire, when moving, is adapted to have an engaging relation and move the member with the wire, a continuously rotatable member positioned in proximity to said oscillatable member and having means to successively and alternately engage said oscillatable member when advanced by the wire and return it to wire actuating position, an electrical circuit including a timer and separable contacts one of which is connected to said oscillatable member and said contacts engageable to close the circuit when oscillatable member is in non-operating position by said rotatable member, clutch shifting means operative on the closing of said circuit and said circuit adapted to be closed when the moving contact between the wire and said oscillatable member has ceased and simultaneously with a predetermined position of said timer and the engagement of said contacts.

5. A stop mechanism for detecting irregularities in the feeding of fence wire, comprising a movably supported member with which a wire, when moving, is adapted to have an engaging relation and move the member with the wire, a rotatable member adapted to positively engage said wire engaging member when advanced by the wire and return it to wire actuating position, an electrical circuit including a timer, a solenoid, and separable contacts one of which is carried by said wire engaging member and the said contacts engageable to close the circuit when said wire engaging member is in non-operating position by said rotatable member, clutch shifting means in operable connection with said solenoid and operable on the closing of said circuit and said circuit adapted to be closed when the moving contact between the wire and said wire engaging member has ceased and simultaneously with a predetermined position of said timer and the engagement of said contacts.

6. A stop mechanism for detecting irregularities in the feeding of fence wire, comprising a movably supported member with which a wire, when moving, is adapted to have an engaging relation and move the member with the wire, a rotatable member adapted to positively engage said wire engaging member when advanced by the wire and return it to wire actuating position, an electrical circuit including a timer and separable contacts one of which is carried by and movable with said wire engaging member and the other contact comprising a liquid switch and the said contacts engageable to close the circuit when said wire engaging member is in non-operating position by said rotatable member, clutch shifting means operable on the closing of said circuit and said circuit adapted to be closed when the moving contact between the wire and said wire engaging member has ceased and simultaneously with a predetermined position of said timer and the engagement of said contacts.

7. A stop mechanism for detecting irregularities in the feeding of fence wire, comprising a support, a spindle secured on said support, a plurality of freely oscillatable members arranged in spaced relation on said spindle and having segment portions provided with wire engaging surfaces with each of which a wire, when moving, is adapted to have an engaging relation and move the said oscillatable members with the movement of the wires, a continuous rotatable shaft journalled on said support and having portions adapted to positively and alternately engage the segment portions of said oscillatable members when advanced by the wires and return each to their wire actuating positions, an electrical circuit including a timer and separable contacts, one each connected with said oscillatable members and the other a liquid switch common to all of the other contacts and the said contacts engageable to close the circuit when any of said oscillatable members are in non-operating position by said shaft, clutch shifting means operative on the closing of said circuit and said circuit adapted to be closed when the moving contact between any of the respective wires and the said respective oscillatable members has ceased and simultaneously with a predetermined position of said timer and the engagement of said contacts.

8. A stop mechanism for detecting irregularities in the feeding of fence wire, comprising a movable member with which a wire, when moving, is adapted to have a frictional engaging relation and move the member in one direction, means to move the member in a direction opposite to the movement of the wire, an electrical circuit, a timer in said circuit associated with said member moving means and operated therewith, clutch actuating means and means operable to close said circuit and actuate said clutch actuating means when a moving contact between the wire and said member has ceased and simultaneously with said member and said timer assuming predetermined positions.

9. A stop mechanism for detecting irregularities in the feeding of fence wire, comprising a plurality of movable members, one for each wire, with each of which a wire, when moving, is adapted to have a frictional engaging relation and move the members in one direction, means to move said members in a direction opposite to the movement of the wires, an electrical circuit, a timer in said circuit associated with said member moving means and operated therewith, clutch actuating means and means operable to close said circuit and actuate said clutch actuating means when a moving contact between any wire and its respective member has ceased and on such member and said timer assuming predetermined positions.

10. A stop mechanism for wire fence machines comprising a plurality of movable members one for each wire and formed to have frictional engaging relation therewith, whereby upon feeding movement of the wire the member thereof will be moved in one direction, means to effect periodic movement of the members in an opposite direction, stopping means for the machine and means operable by each member upon breaking of a wire, to actuate said stopping means.

11. In a wire fence machine, a pivoted member for each wire having means to frictionally engage the same and to be moved thereby in one direction upon feeding movement of the wire, continuous rotating means for periodically moving each member in an opposite direction and upon breaking of the wire to hold said member from movement in the direction of feed of the wire, stopping means, and means operable by each member for actuating the stopping means upon breaking of the wire thereof.

WILLIAM H. SOMMER.